3,182,032
CROSS - LINKED TRIISOCYANATE - COAL TAR COATING AND SEALING REACTION PRODUCT
Francis R. Charlton, Pittsburgh, and Floyd D. Trischler, Bridgeville, Pa., assignors to Koppers Company, Inc., a corporation of Delaware
No Drawing. Filed Aug. 22, 1961, Ser. No. 133,022
4 Claims. (Cl. 260—28)

This application is a continuation-in-part of our copending application Serial No. 708,372, filed January 13, 1958.

This invention relates to surface coatings and joint sealers and, more particularly, to novel coating and sealer compositions which cure at ambient temperatures to tough, flexible, insoluble, infusible compositions that are resistant to most chemicals and solvents.

Coatings of coal tar have been used for protecting a great many corrosion susceptible materials because coal tar will resist weathering and prevent corrosion of these materials when they are subjected to a variety of environments. For example, coal tar has been and is being used for protection of underground piping and tanks, both steel and concrete; for the protection of aboveground tanks and structural steel; and for the prevention of corrosion in marine, fresh water and potable water service units.

These coatings of coal tar have been applied heretofore either at elevated temperatures (hot melt) or dissolved in solvents and applied at ambient temperatures. Applying coal tar coatings at elevated temperatures is disadvantageous because it is expensive and laborious and because irritating fumes are released. The application of coal tar in solvents at ambient temperatures (coal tar cut-backs) is disadvantageous because the coating is thin or cut-back with solvents and therefore, the thickness to which the coating can be applied without sagging and dripping is limited and when the solvent evaporates and such coatings dry, they tend to become brittle and subject to destruction by impact or corrosion. Also, since these coatings are of a thermoplastic nature, the upper range of temperatures to which such coatings can be subjected is limited. The chemical resistance of the tar coatings is also limited for, as is well known, tar will dissolve in common aromatic solvents. Because of the foregoing temperature and chemical resistant limitations, tar coating compositions which have been used for the expansion and contraction joints in roadways and air fields have not been satisfactory, especially in air fields whereon jet aircraft are operating because the jet fuel and the heat and exhaust velocity of the jet has tended to deteriorate and decompose such compositions.

An object of this invention, therefore, is to provide a novel coating composition which can be applied under ambient conditions and thereafter will set at ambient atmospheric conditions to provide products that are tough, flexible, insoluble, infusible and heat resistant and that exhibit high resistance to attack by chemicals, solvents, high temperatures, moisture and impact, and that adhere to concrete, metal, masonry and wooden surfaces so as to be usable as joint sealers, waterproofing agents, and road material binders.

Broadly stated, the products of this invention comprise the reaction product of a tar fraction and a resin that is formed by the reaction of a triisocyanate with a curing agent having a plurality of active hydrogen atoms.

Similar chemical compositions have been made in the past but none have been suitable for providing good low temperature cure coatings. For example, German Patent No. 855,911 describes the combination of coal tar pitch, a diisocyanate and a polyester to produce molded or cast articles; the molding compositions being heated to effect a final cure. It has been found that diisocyanates of the German patent, if used in a tar coating composition, will cause brittleness in the coating because of an uncontrollable curing rate.

In contrast to the heated casting compositions of the German patent in which diisocyanates are used, the coating compositions of this invention contain as a necessary component, a triisocyanate. Surprisingly, the curing rates of the triisocyanates of applicant's invention can be controlled thereby preventing brittleness in the final product.

Efforts were made to use the compositions described in German Patent No. 855,911 as surface coatings which would cure at ambient temperatures to tough, flexible, insoluble, infusible compositions which would resist chemicals and solvents. Using the teachings of both examples in the patent, products were obtained which had little utility as protective coatings. These products failed to resist such environments as distilled water, sea water, ethyl alcohol, water at 160° F., 20 percent solution of hydrochloric acid, 10 percent nitric acid and a 20 percent solution of sulphuric acid. Additionally, when the ratio of resin to tar was varied according to the teachings of the patent, formulations were made which could not even be used as a coating because they either remained tacky after a long period of time or remained as a viscous liquid which made further testing impossible. Attempts were also made to improve the properties of these compositions by baking them at 150° C. Even after baking, the materials showed little improvement in solvent and chemical resistance.

U.S. Patent No. 2,844,544 describes methods of processing diisocyanate linked elastomer compositions. This process comprises the addition of a small amount of an ingredient, such as beeswax, to diisocyanate linked elastomers so that they can be readily handled on an ordinary milling machine. The patentee alleged that normal processing aids employed in rubber compounding, including coal tar, do not improve the processing characteristics of diisocyanate linked elastomers and, in most cases, are difficult to handle.

An attempt was made to prepare a coating containing a diisocyanate linked elastomer using the preferred range of materials taught by the U.S. patent, including 2 percent tar in the composition. Following the mixing of the components, a violent exotherm occurred and the temperature rose to 120° C. The material could not be applied to a substrate at ambient temperatures. An attempt was even made to apply the material by mixing it in a dry ice bath. Unfortunately, as the material cured on the testing substrate, it foamed so badly that the final film thickness was approximately three times the original thickness, thereby giving a very porous, brittle and friable structure which could not possibly be used as an environmental protective coating.

In accordance with the present invention, a coating composition is provided which consists essentially of the reaction product of a resin and a tar.

The particular resin contained in the coating composition of this invention is formed by the curing action of a cross-linking agent having a plurality of active hydrogens with a triisocyanate. The resin formed by the cross-linking action is comprised of the cross-linking agent being used to the extent of 0.5 to 1.4 equivalents of isocyanate groups of the triisocyanate to 1 equivalent of active hydrogen of the cross-linking agent and the resin so formed is contained in the cured coating composition of this invention in an amount of 1 part resin to 1–5.5 parts by weight of tar.

The coating compositions of this invention that contain the proportions of materials hereinabove recited cure at ambient temperatures to form coatings that are tough, flexible, insoluble, infusible and resistant to chemicals.

The resin is contained in the cured coating composition in an amount of 1 part resin to 5.5 parts by weight of tar. If the amount of tar to resin is less than 1:1 then the cured coating composition will not properly adhere to a substrate to which it is applied for protection. If the amount of tar to resin is greater than 5.5:1 parts by weight then there is no cured coating composition because the materials comprising the composition do not set at ambient temperatures as is required for this invention.

The cross-linking agent is used to the extent of 0.5 to 1.4 equivalents of isocyanate groups to 1 equivalent of active hydrogen. If the number of equivalents of isocyanate groups is less than 0.5, an improperly cured coating composition results, whereby the coating is susceptible to chemical attack and if the number of equivalents of isocyanate groups is greater than 1.4, the cured coating composition retains moisture from the air and reacts to give off carbon dioxide, thereby resulting in a foamed type composition which is not useful as a protective coating.

Representative triisocyanates useful in the compositions of this invention include alkyl triurethane triisocyanates such as those represented by the general formula:

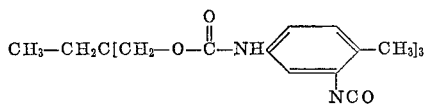

tris-(4-isocyanatophenyl)-methane, and 2,4,4'-triisocyanatodiphenyl ether.

The curing agents useful in the compositions of the present invention include polyfunctional compounds containing groups reactive with isocyanate groups such as amines, amides, dihydric phenols, polyols and polyglycols and hydroxylated aliphatic polyesters made from a stoichiometric excess of the alcohol. Obviously, the specific choice of active hydrogen containing curing agents will be determined by the desired pot life (the useful life of the mixed components during which they may be used or applied after mixing).

Representative amine compounds which may be used include N-aminopropyl resorcinol, 2,2-aminoethylaminoethanol and polyglycolethylenediamine, tetraethylenepentamine, pentaethylenehexamine, methylaminopropylamine and isopropylaminopropylamine.

Representative amides include hexamethylenediamide, isophthalic acid diamide, Versamid (di and trimerized fatty acids reacted with polyamines such as ethylenediamine).

Representative alkyl, aryl, aralkyl and alkaryl polyols include the dihydric phenols, such as resorcinol, hydroquinone, pyrogallol, Bisphenol A and phloroglucinol as well as glycol, glycerol, polyethyleneglycol, hexane-1,2,6-triol, neopentyl glycol and hexyleneglycol, the novolaks, resorcinol formaldehyde resins and polyhydroxylpolyalkaryl polyethers such as are described in our copending application, Serial Number 708,379.

The polythiols include compounds such as Thiokol which are polyethylene-polysulphides having the general formula:

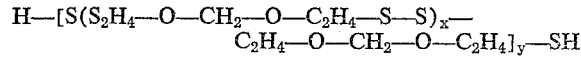

wherein $x$ and $y$ represent a whole integer greater than one.

The aliphatic polyesters useful as cross-linking agents in this invention include adipic acid-trimethylolpropane polyesters, succinic acid ethyleneglycol polyesters, sebacic acid-hexamethyleneglycol polyesters, adipic acid-glycerine polyesters, fumaric acid-2,2-dimethyl-1,3-propyleneglycol polyesters, adipic acid-1,4-butyleneglycol polyesters, azoleic acid-1,4-dihydroxy-2-butene polyesters and suberic acid-decamethylene glycol polyesters. The polyesters should have acid numbers no greater than twenty and preferably no greater than five. If the acid number is greater than twenty the desired coating would be characterized by an undesirable excessive foaming.

Water or carboxylic acids should not be used as curing agents because the intermediates formed therefrom are unstable and the evolved carbon dioxide thereby disrupts the surface of the coating.

The tar component includes one or more of the following which are herein termed tar: crude tar, road tar, coke oven heavy oil, creosote, topped tar (tar from which the lighter constituents have been removed), coal tar pitch and coal digestion pitch.

For joint sealers and coating compositions, the solvents include for example, ketones, esters, or aromatic solvents, such as methyl ethyl ketone, butyl acetate, coal tar naphtha, benzene, toluene, xylene, and Cellosolve acetate (ethylene glycol monoethyl ether acetate), or mixtures thereof. These may be used up to 75 percent of the weight of the mixture.

If desired to improve impact resistance the composition of the coatings of this invention may include inert fillers. The inert fillers include mica, asbestos, talc, powdered and flaked glass, slate dust, clay alumina, and Carborundum. To obtain films of the desired thickness without sagging, a small percentage of false bodying agent may be incorporated, i.e., 1–2 percent silica dust.

If desired, elastomers or plasticizers which are soluble or dispersible in the tar fraction may be added to impart elasticity. Suitable elastomers include polyvinyl acetate, polyvinyl chloride, polyvinyl acetate chloride copolymers, polyvinyl acetals, polyvinyl alcohol, natural and synthetic rubbers, butadiene-acrylonitrile copolymers, butadiene-styrene copolymers, polyethylene polysufides (Thiokol), nylons and Versamid polyamides.

The coating compositions of this invention cure at ambient temperature conditions to provide films which are resistant to those chemicals and solvents which have attacked the heretofore known cold applied and air set coatings. The coatings of this invention, for instance, have been found to resist long time exposure to such solvents as xylene, toluene and other aromatics and to petroleum products varying from sour crude to high octane gasoline. Additionally, the coatings, because of their tough, infusible, insoluble nature are unaffected by soil stress. The coatings further have the advantage of being resistant to heat and of showing no degradation at temperatures up to 300° F. Surprisingly, the coatings of this invention, having the foregoing desirable properties, are applied at normal, ambient temperatures and under normal humidity conditions.

We have also found unexpectedly that the novel compositions of this invention, having elastomers admixed therewith in an amount up to 10 percent of the tar component, can be applied as joint sealers under ambient conditions in thicknesses up to one inch and can be cured in place at ambient temperatures. The compositions, so cured, remain for long periods of time in the joint and neither weather nor jet fuel adversely affects their performance.

The compositions of this invention provide products exhibiting superior resistance to attack by chemicals, solvents, moisture, high temperature and impact. The properties exhibited by the cured compositions are novel when compared to the characteristics of prior art bituminous compositions. For instance, the coal tar fraction alone is substantially soluble in such solvents as naphtha and the lower ketones; whereas, the cured compositions of this invention are substantially inert and insoluble in such solvents. Coal tar pitches and fractions will melt to flowable liquids at relatively low temperatures; whereas, the compositions of this invention are infusible and exhibit no melting point, but char or decompose at relatively high temperatures.

Since the triisocyanate compound and the cross-linking agent will react at room temperature to form the tough, inert insoluble and infusible product, this invention should be made in a two component composition, one component containing the triisocyanate and the other, the curing or cross-linking agent. The coal tar pitch solvents and fillers which are normally inert to either component may be present in either the triisocyanate component portion or the cross-linking portion.

The invention is illustrated but not limited by the following examples:

Example I

To a mixing tank equipped with suitable heating means and mixing means is added 42.2 parts of pitch heavy oil at a temperature of 180 to 250° F. The thus charged heavy oil is allowed to cool to 170 to 180° F. with mixing. To the cooled pitch heavy oil is added 12.5 parts of toluene while mixing is continued for about fifteen minutes. Then 21.2 parts of slate dust is added and mixing is continued for another fifteen minutes. This mixture is then allowed to cool to about 115° F. To the above mixture is then added 23.3 parts of Multron R–4 solution (11.2 parts of Multron R–4 dissolved in 12.2 parts of Cellosolve acetate) while mixing continues for at least thirty minutes. This mixture is the first component of the coating composition which for ease of understanding is designated as Part A. To prepare a coating Part A is added to the second component, herein designated as Part B, as follows: to 100 parts of the above mixture is then added 18.7 parts of the triisocyanate Mondur CB–75 and 7 parts of toluene whereafter the material may immediately be applied to any surface to provide a coating having excellent adhesion, chemical resistance, flexibility and temperature resistance.

Using the procedure described in Example I, the following examples of the coating composition of this invention were prepared:

Example II

| | |
|---|---|
| Modur C (Mobay Chemical Co.) | 8.6 |
| Topped tar | 51.7 |
| Slate dust | 25.9 |
| Sec. butyl acetate | 2.9 |
| Toluene | 6.9 |

100 parts wt./wt. of the above cured with 1.2 parts hexane 1:2:6 triol.

Example III

| | |
|---|---|
| Mondur CB–75 (Mobay Chemical Co.) | 8.6 |
| Topped tar | 51.7 |
| Slate dust | 25.9 |
| Sec. butyl acetate | 2.0 |
| Toluene | 6.9 |

100 parts wt./wt. of the above cured with 2.4 parts hexane 1:2:6 triol.

Example IV

| | |
|---|---|
| Ortho cresol novolak, m.p. 136–138° C. | 8.4 |
| Topped tar | 44.4 |
| Slate dust | 22.2 |
| Sec. butyl acetate | 2.9 |
| Toluene | 6.9 |

100 parts wt./wt. of the above cured with 11.2 parts Mondur CB–75.

Example V

| | |
|---|---|
| Triethylene glycol | 6.2 |
| Topped tar | 45.9 |
| Slate dust | 22.9 |
| Toluene | 12.5 |
| Sec. butyl acetate | 12.5 |

100 parts wt./wt. of the above cured with 18.8 parts Mondur CB–75.

Example VI

| | |
|---|---|
| Ortho cresol novolak m.p. 136–138° C. | 4.2 |
| Multron R–4 (Mobay Chemical Co.) | 4.2 |
| Topped tar | 44.4 |
| Slate dust | 22.2 |
| Toluene | 12.5 |
| Sec. butyl acetate | 12.5 |

100 parts wt./wt. of the above cured with 16.6 parts Mondur CB–75.

Example VII

| | |
|---|---|
| Multron R–4 | 8.4 |
| Topped tar | 44.4 |
| Slate dust | 22.2 |
| Toluene | 12.5 |
| Sec. butyl acetate | 12.5 |

100 parts wt./wt. of the above cured with 18.3 parts Mondur CB–75.

Example VIII

| | |
|---|---|
| Epon 1001 | 84.3 |
| Phenol | 15.7 |

Reacted at 180–240° C. for 4 hours. Diluted with

| | |
|---|---|
| methyl isobutyl ketone | 34.6 |
| Above solution | 21.5 |
| Topped tar | 39.8 |
| Slate dust | 19.9 |
| Toluene | 12.5 |

100 parts wt./wt. of the above cured with 13.1 parts Mondur CB–75.

Example IX

| | |
|---|---|
| Ortho cresol novolak, M. Pt. 136–138° C. | 9.9 |
| Topped tar | 52.4 |
| Slate dust | 26.2 |
| Sec. butyl acetate | 3.4 |
| Toluene | 8.1 |

100 parts of the above cured with 16.2 parts Triisocyanate (Mondur CB–75).

Example X

| | |
|---|---|
| Triethylene glycol | 6.2 |
| Pitch-heavy oil blend | 45.9 |
| Slate dust | 22.9 |
| Toluene | 12.5 |
| Cellosolve acetate | 12.5 |

100 parts of the above cured with 18.8 parts Triisocyanate (Mondur CB–75).

Example XI

| | |
|---|---|
| Polysulfide rubber (Thiokol LP–2) | 22.5 |
| Pitch-heavy oil blend | 35.0 |
| Slate dust | 17.5 |
| Toluene | 12.5 |
| Cellosolve acetate | 12.5 |

100 parts of the above cured with 2.2 parts Triisocyanate (Mondur CB–75).

Example XII

| | |
|---|---|
| Ortho cresol novolak, M. Pt. 136–138° C. | 4.2 |
| Adipic acid-trimethylol propane polyester (Multon R–4) | 4.2 |
| Pitch-heavy oil blend | 44.4 |
| Slate dust | 22.2 |
| Toluene | 12.5 |
| Cellosolve acetate | 12.5 |

100 parts of the above were cured with 16.6 parts Triisocyanate (Mondur CB–75).

Example XIII

| | |
|---|---|
| Adipic acid-trimethylol propane polyester (Multron R-4) | 8.4 |
| Pitch-heavy blend oil | 44.4 |
| Slate dust | 22.2 |
| Toluene | 12.5 |
| Sec. butyl acetate | 12.5 |

100 parts of the above cured with
18.3 parts Triisocyanate (Mondur CB-75).

Example XIV

| | |
|---|---|
| Epoxy resin (Epon 1001) | 84.3 |
| Phenol | 15.7 |

Reacted at 180–240° C. for 4 hours. Diluted with

| | |
|---|---|
| methyl isobutyl ketone | 34.6 |
| Above solution | 23.0 |
| Topped tar | 42.5 |
| Slate dust | 21.2 |
| Toluene | 13.3 |

100 parts of the above cured with
13.1 parts Triisocyanate (Mondur CB-75).

Example XV

| | |
|---|---|
| Versamid 125 | 8.4 |
| Pitch-heavy oil blend | 44.4 |
| Slate dust | 22.2 |
| Toluene | 12.5 |
| Cellosolve acetate | 12.5 |

100 parts of the above cured with
16.6 parts triisocyanate (Mondur CB-75).

Example XVI

| | |
|---|---|
| Resorcinol formaldehyde resin | 6.2 |
| Topped tar | 45.9 |
| Slate dust | 22.9 |
| Sec. butyl acetate | 25.0 |

100 parts of the above cured with
18.4 parts triisocyanate (Mondur CB-75).

Epon 1001 is a commercial diepoxy resin made from bisphenol A and epichlorohydrin having an epoxy equivalent of 500.

Versamid 125 is the trade name for a polyamide resin made from dimerized or trimerized unsaturated vegetable oil fatty acids and aryl or alkyl polyamines.

The two component products of Examples I through VII were brushed onto a sand blasted steel pipe line and allowed to dry at 40° F. for from four to twenty-four hours. These mixtures set into tough, infusible, insoluble, corrosion-resistant coatings. Examples VIII through XIV were sprayed on several 12″ x 12″ wooden pier pilings and allowed to dry at room temperature for from one to twenty-four hours. This sprayed-on mixture became set into a tough, infusible, insoluble, corrosion-resistant film. Two component mixtures of Examples XV through XVII were alternately brushed and sprayed onto lightly sanded, galvanized metal, rough sanded aluminum and onto concrete. In each instance, the mixture became set into a tough, infusible, insoluble, corrosion-resistant film within about twenty-four hours at a temperature of about 40° F. The coatings that resulted from the above-described examples all had excellent adhesion to the varying substrates to which they were applied.

Samples of the formulations described in the foregoing examples were painted onto freshly sand blasted ⅛″ thick steel panels to a thickness of 7–10 mils and were allowed to dry at room temperature for twenty-four hours. Upon drying, the sample coated panels were immersed for thirty days in a variety of solvents and chemicals and at the conclusion of the immersion period were examined for appearance, impact resistance, jeep resistance (minimum voltage required to transmit a current through the coating), flexibility and adhesion. The results of these tests are outlined in Table I which follows.

TABLE I.—THIRTY-DAY SOLVENT IMMERSION TEST—TAR-RESIN COATING

| Solvent | Impact at −40° C. (radius in ⅛ in.) | Jeep test (volts) | Adhesion | Flexibility | Appearance and remarks |
|---|---|---|---|---|---|
| Air | 4 | 8,000+ | Excellent | ⅜″ Mandrel bend after 40 days. | Glossy. |
| Hexane | 5 | 8,000 | do | Slightly brittle | Slightly browned. |
| Premium gas | 4 | 6,000 | do | do | Unaffected. |
| Formalin | 5 | 8,000 | do | Good | Dulled. |
| Methyl ethyl ketone | 5 | | | | Blistered and dulled. |
| Distilled water | 4 | 8,000+ | Excellent | Slightly brittle | Unaffected. |
| Salt water | 4 | 8,000+ | do | Good | Do. |
| Sea water | 3 | 8,000+ | do | Slightly brittle | Do. |
| Sour crude oil | 4 | 8,000+ | do | Good | Do. |
| 10% hydrochloric acid | 5 | 8,000+ | do | do | Slightly dulled. |
| Conc. hydrochloric acid | 5 | 2,000 | do | do | Coating lifted on edges of panel. |
| 10% nitric acid | 4 | 6,000 | do | Slightly brittle | Unaffected. |
| 10% sulfuric acid | 5 | 5,000 | do | do | Dulled, undercut on scribe mark and edges of panel. |
| 20% sulfuric acid | 4 | 8,000+ | do | do | Dulled. |
| 20% sodium acetate | 5 | 8,000+ | do | do | Unaffected. |
| 20% calcium chloride | 4 | 7,000 | do | Good | Do. |

Example XVII

| | |
|---|---|
| Resorcinol | 5.0 |
| Pitch-heavy oil blend | 46.7 |
| Slate dust | 23.3 |
| Toluene | 12.5 |
| Cellosolve acetate | 12.5 |

100 parts of the above cured with
20 parts triisocyanate (Mondur CB-75).

Mondur CB-75 is the trade name of an [alkyl triurethane triisocyanate] (as a 75% solution in ethyl acetate) and represented by the general formula:

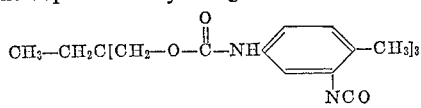

In the aforementioned table, impact was tested by cooling the panels at minus 40° C. for 30 minutes, then the impact resistance was determined by dropping a two pound steel ball 8 feet onto the coated side of the panel. The radius of the disbonded area in inches was recorded.

The jeep resistance was determined by finding the minimum voltage required to transmit a current through the coating, or to cause a break in the coating.

The flexibility of the coating after air drying was found by bending a coated thin steel panel over a variable bend flexibility mandrel at room temperature. The smallest diameter over which the coating was bent without damage was recorded. The panel was solvent cleaned and lightly sanded before coating.

Adhesion was measured qualitatively by the ease with which a peel knife could be forced between the steel panel and the coating.

The cured coating compositions of this invention possess excellent physical and chemical properties. These films, in addition to having excellent chemical and physical resistance, are flexible and extremely hard. The coatings can be applied by either brushing or spraying techniques and will cure and adhere to any suitable substrate at ambient temperatures and humidity conditions.

We claim:

1. A non-foamed coating and sealant capable of curing at ambient temperatures and characterized by flexibility, insolubility, infusibility, toughness, and resistance to chemicals, consisting essentially of the reaction product of a resin and coal tar, said resin being formed by the curing action of a cross-linking agent having a plurality of active hydrogens wtih a triisocyanate selected from the group consisting of an alkyl triurethane triisocyanate of the formula:

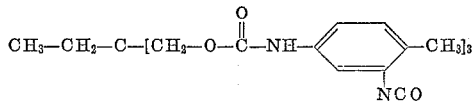

tris(4-isocyanatophenyl)methane, and 2,4,4'-triisocyanatodiphenyl ether, said cross-linking agent being selected from the group consisting of amines, amides, hydroxylated aliphatic polyesters and alkyl, aryl, aralkyl, and alkaryl polyols and being used to the extent of 0.5 to 1.4 equivalents of isocyanate groups of the triisocyanate to one equivalent of active hydrogen of the cross-linking agent, said resin being present in said coating and sealant in an amount of one part resin to 1.0 to 5.5 parts by weight of tar, and said coating and sealant being finally formed by the addition of said cross-linking agent to said tar and thereafter the addition of said triisocyanate thereto.

2. A non-foamed coating composition consisting essentially of the reaction product of from 1 to 5.5 parts by weight of coal tar with one part by weight of a resin, said resin being formed by the reaction of a cross-linking agent with a triisocyanate selected from the group consisting of an alkyl triurethane triisocyanate of the formula:

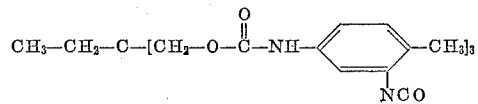

tris(4-isocyanatophenyl)methane, and 2,4,4'-triisocyanatodiphenyl ether, said cross-linking agent being selected from the group consisting of amines, amides, hydroxylated aliphatic polyesters and alkyl, aryl, aralkyl, and alkaryl polyols and said coating composition being finally formed by the addition of said cross-linking agent to said tar and thereafter the addition of said triisocyanate thereto, thereby providing a coating composition which resists attack by chemicals, solvents, high temperatures, and impact.

3. A non-foamed coating, said coating being cured at ambient temperatures and being characterized by flexibility, insolubility, infusibility, toughness, and resistance to chemicals, consisting essentially of the reaction product of a resin and coal tar, said resin being formed by the curing action of a cross-linking agent having a plurality of active hydrogens with an alkyl triurethane triisocyanate of the formula:

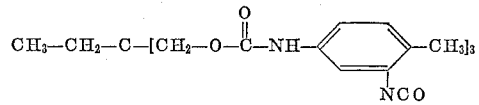

said cross-linking agent being selected from the group consisting of amines, amides, hydroxylated aliphatic polyesters and alkyl, aryl, aralkyl, and alkaryl polyols and being used to the extent of 0.5 to 1.4 equivalents of isocyanate groups of the triisocyanate to one equivalent of active hydrogen of the cross-linking agent, said resin being contained in said coating in an amount of one part resin to 1.0 to 5.5 parts by weight of tar, said coating being finally formed by the addition of said cross-linking agent to said tar and thereafter the addition of said triisocyanate thereto.

4. The composition of claim 3 wherein the cross-linking agent is an adipic acid trimethylolpropane polyester with a hydroxyl number of about 280 and an acid number of about 5.

References Cited by the Examiner

UNITED STATES PATENTS

| | | | |
|---|---|---|---|
| 2,625,531 | 1/53 | Seeger | 260—77.5 |
| 2,786,864 | 3/57 | Wirth et al. | 260—77.5 |
| 2,799,663 | 7/57 | Hampton et al. | 260—77.5 |
| 3,020,249 | 2/62 | Curtis | 260—471 |

FOREIGN PATENTS 855,911  11/52  Germany.

MORRIS LIEBMAN, *Primary Examiner*.

MILTON STERMAN, *Examiner*.

UNITED STATES PATENT OFFICE
CERTIFICATE OF CORRECTION

Patent No. 3,182,032                          May 4, 1965

Francis R. Charlton et al.

It is hereby certified that error appears in the above numbered patent requiring correction and that the said Letters Patent should read as corrected below.

Column 3, line 63, strike out "such as Thiokol"; column 4, line 38, strike out "(Thiokol)"; column 6, line 56, strike out "(Thiokol LP-2)".

Signed and sealed this 15th day of March 1966.

(SEAL)
Attest:

ERNEST W. SWIDER                            EDWARD J. BRENNER
Attesting Officer                                Commissioner of Patents